(12) United States Patent
Iisaka

(10) Patent No.: US 11,421,334 B2
(45) Date of Patent: Aug. 23, 2022

(54) TIN SOLUTION FOR TIN FILM FORMATION AND METHOD FOR FORMING TIN FILM USING THE SAME

(71) Applicant: TOYOTA JIDOSHA KABUSHIKI KAISHA, Toyota (JP)

(72) Inventor: Hirofumi Iisaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 16/658,665

(22) Filed: Oct. 21, 2019

(65) Prior Publication Data

US 2020/0157697 A1 May 21, 2020

(30) Foreign Application Priority Data

Nov. 16, 2018 (JP) .............................. JP2018-215343

(51) Int. Cl.
*C25D 3/32* (2006.01)
*H01M 4/04* (2006.01)

(52) U.S. Cl.
CPC ............ *C25D 3/32* (2013.01); *H01M 4/0416* (2013.01); *H01M 4/0452* (2013.01); *H01M 2300/0082* (2013.01)

(58) Field of Classification Search
None
See application file for complete search history.

(56) References Cited

U.S. PATENT DOCUMENTS

| 2004/0251143 | A1* | 12/2004 | Kazuyuki | C25D 3/60 205/302 |
| 2009/0098398 | A1 | 4/2009 | Yanada et al. | |
| 2011/0308960 | A1* | 12/2011 | Orihashi | C25D 3/32 205/302 |
| 2015/0014178 | A1 | 1/2015 | Hiraoka et al. | |

FOREIGN PATENT DOCUMENTS

| CN | 102418123 A | 4/2012 |
| CN | 104011269 A | 8/2014 |
| JP | 2001172791 A | 6/2001 |
| JP | 2003142088 A | 5/2003 |
| JP | 2006070340 A | 3/2006 |
| JP | 2007-239076 A | 9/2007 |
| JP | 2018-035426 A | 3/2018 |

* cited by examiner

*Primary Examiner* — Wojciech Haske
(74) *Attorney, Agent, or Firm* — Dickinson Wright, PLLC

(57) ABSTRACT

A tin solution applicable to tin film formation by solid electrolyte deposition, and a method for forming a tin film using the solution are provided. The tin solution contains tin methanesulfonate, methanesulfonic acid, water, an isopropyl alcohol, and a polyethylene-block-poly (ethylene glycol).

4 Claims, 12 Drawing Sheets

TIN SOLUTION FOR TIN FILM FORMATION AND METHOD FOR FORMING TIN FILM USING THE SAME

CROSS REFERENCE TO RELATED APPLICATIONS

The present application claims priority from Japanese patent application JP 2018-215343 filed on Nov. 16, 2018, the content of which is hereby incorporated by reference into this application.

BACKGROUND

Technical Field

The present disclosure relates to a tin solution for tin film formation and a method for forming the tin film using the tin solution.

Background Art

Conventionally, tin plating has been widely used for forming an upper electrode of an electronic device. For example, in a field of a multilayer ceramic capacitor as a chip-type electronic component, a tin plating layer is generally formed on a surface of an external electrode of the multilayer ceramic capacitor.

It has been known that whiskers occur on the tin plating layer. To solve this problem, it has been advocated to use an alloy of tin and lead. However, plating with the tin-lead alloy causes a large environmental load. Therefore, a lead-free tin material is required. JP 2007-239076 A discloses that the use of a plating solution containing tin methanesulfonate, sodium sulfate, and an amphoteric surfactant ensures formation of a lead-free and whisker-resistant tin film.

Incidentally, JP 2018-035426 A discloses a method referred to as a solid electrolyte deposition (SED) as a method for forming a nickel coating. In the solid electrolyte deposition disclosed in JP 2018-035426 A, a solid electrolyte membrane is disposed between an anode and a cathode (substrate), an aqueous solution containing the metal ion is provided between the anode and the solid electrolyte membrane, the solid electrolyte membrane is brought in contact with the substrate, a voltage is applied between the anode and the cathode, and a pressure is applied to the aqueous solution so that a fluid pressure of the aqueous solution causes the metal ion from the inside of the solid electrolyte membrane to turn into metal deposit on the cathode side, thereby forming a metal coating made of a metal of the metal ion on a surface of the substrate.

SUMMARY

According to the study by the inventor, the tin plating method disclosed in JP 2007-239076 A has a problem that because of island growth of tin, an underlying layer is exposed to the surface without being coated with the tin film. Meanwhile, the solid electrolyte deposition is a film forming method that ensures the metal coating formation without an undeposited area such as a hole and a depression, but it is necessary for forming the tin film by the solid electrolyte deposition to prepare a solution with an appropriate composition as the aqueous solution containing the tin ion. For example, the plating solution disclosed in JP 2007-239076 A cannot be used as the solution used for the solid electrolyte deposition because an amphoteric surfactant in the plating solution reacts with a sulfo group on the surface of the solid electrolyte membrane.

The present disclosure provides a tin solution applicable to tin film formation by solid electrolyte deposition and a method for forming a tin film using the solution.

According to a first aspect of the present disclosure, there is provided a tin solution for tin film formation that contains tin methanesulfonate, methanesulfonic acid, water, an isopropyl alcohol, and a polyethylene-block-poly (ethylene glycol).

According to a second aspect of the present disclosure, there is provided a method for forming a tin film that includes: impregnating a solid electrolyte membrane having a sulfo group with the tin solution according to the first aspect; disposing the solid electrolyte membrane between a substrate as a cathode and an anode such that the substrate is in contact with the solid electrolyte membrane; and applying a voltage between the anode and the substrate to deposit tin on a surface of the substrate.

The tin solution according to the first aspect uses polyethylene-block-poly (ethylene glycol), which is a nonionic surfactant, as a surfactant. This nonionic surfactant does not react with the sulfo group of the solid electrolyte membrane. Therefore, the use of the tin solution according to the first aspect enables the tin film formation by the solid electrolyte deposition.

DETAILED DESCRIPTION

<Tin Solution>

A tin solution (tinning bath) according to the embodiment contains tin methanesulfonate, methanesulfonic acid, water, isopropyl alcohol (IPA), and a nonionic surfactant.

The tin methanesulfonate is a supply source of tin ions. A concentration of the tin (tin ion) in the tin solution may have any value, and may be, for example, 80 to 400 g/L.

The methanesulfonic acid avoids hydrolyzation of the tin solution and improves a conductivity of the tin solution. A concentration of the methanesulfonic acid in the tin solution may have any value, and may be, for example, 1 to 25 M.

A methanesulfonic acid bath (methanesulfonate bath) using methanesulfonate and the methanesulfonic acid has a property where the tin concentration is allowed to be higher because of a high solubility of metal compared with a sulfuric acid bath (sulfate bath) and a property where an oxidation reaction of divalent tin ions to tetravalent tin ions is less likely to occur.

Polyethylene-block-poly (ethylene glycol) is used as the nonionic surfactant, and for example, a lauryl alcohol/ethylene oxide adduct can be used. A concentration of the nonionic surfactant in the tin solution may have any value, and may be, for example, 0.003 to 0.1 M. A count of ethylene units (m) and a count of ethylene oxide units (n) in the polyethylene-block-poly (ethylene glycol) can be appropriately chosen depending on the solid electrolyte membrane used for the tin film formation as described later.

A concentration of the IPA in the tin solution may have any value, and may be, for example, 0.08 to 2.4 M. The IPA has a function to decrease a critical micelle temperature (minimum temperature where the nonionic surfactant forms a micelle) of the nonionic surfactant.

The tin solution may further contain other components in addition to the above-described components.

Figure 1:
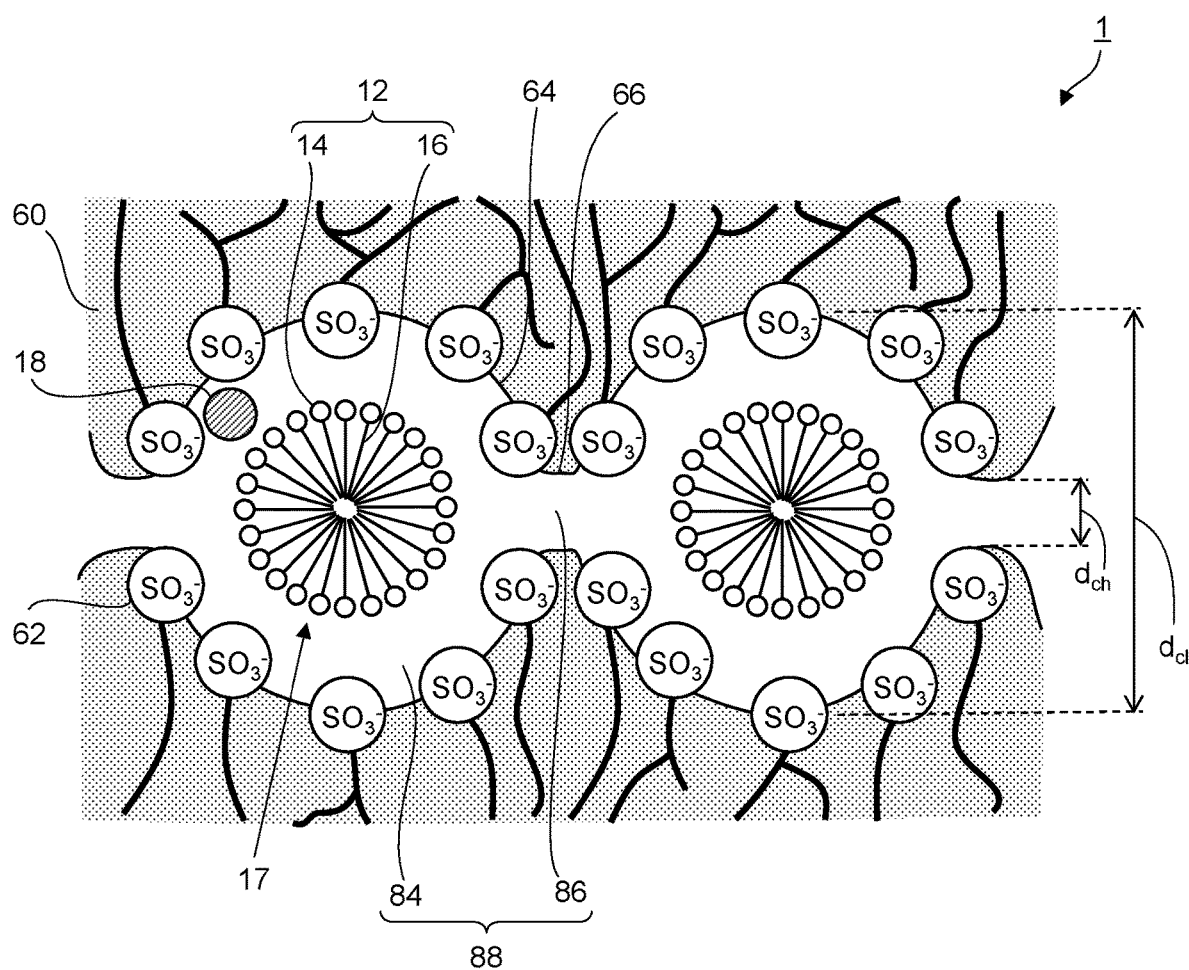
FIG. 1 is a schematic drawing for describing an ion channel structure in a solid electrolyte membrane of the present disclosure.

A behavior of the tin solution according to the embodiment in the solid electrolyte membrane will be described with reference to FIG. 1.

First, an ion channel structure 1 of a solid electrolyte membrane 60 used in the solid electrolyte deposition will be described. The solid electrolyte membrane 60 is formed of molecules having hydrophobic main chains and hydrophilic side chains having sulfo groups (sulfonic acid groups) 62. For example, as the solid electrolyte membrane 60, a perfluorosulfonic acid-based ion exchange membrane (Nafion (trade name) manufactured by DuPont, Felmion (trade name) manufactured by AGC Inc., Aciplex (trade name) manufactured by Asahi Kasei Corporation, Gore-Select (trade name) manufactured by W. L. Gore & Associates, Co., LTD., and the like) composed of linear molecules having hydrophobic main chains formed of PTFE backbone and hydrophilic side chains having ether bonds and sulfo groups can be used. The solid electrolyte membrane 60 may have a structure which is phase-separated into a hydrophobic part composed of the hydrophobic main chains and a hydrophilic part composed of the hydrophilic side chains. This provides the solid electrolyte membrane 60 with ion clusters 64 and neck portions 66. The ion cluster 64 internally has a sphere space 84. The neck portion 66 internally has a flow passage 86 that couples the spaces 84 inside the adjacent ion clusters 64 to one another. The space 84 inside the ion cluster 64 and the flow passage 86 inside the neck portion 66 constitute an ion channel 88 through which the ions pass. The solid electrolyte membrane 60 has sulfo groups 62 on an inner wall surface of the ion cluster 64. The space 84 inside the ion cluster 64 has a diameter (ion cluster diameter) $d_{cl}$ that typically may be 10 to 300 Å, and the flow passage 86 inside the neck portion 66 has a diameter (ion channel diameter) $d_{ch}$ that typically may be 0.5 to 40 Å. The ion channel structure 1 of the solid electrolyte membrane 60 can be observed with an electron microscope. Therefore, the ion cluster diameter $d_{cl}$ and the ion channel diameter $d_{ch}$ can be measured through the electron microscope observation. The ion cluster diameter $d_{cl}$ can be measured also through small angle X-ray scattering.

The solid electrolyte membrane 60 is impregnated with the tin solution according to the embodiment at a temperature less than the critical micelle temperature of a nonionic surfactant 12, and subsequently, the solid electrolyte membrane 60 is heated to the critical micelle temperature of the nonionic surfactant 12 or more, thus a spherical micelle 17 of the nonionic surfactant 12 is formed in the space 84 inside the ion cluster 64. The nonionic surfactant 12 has hydrophilic groups 14 facing outside of the micelle 17 and hydrophobic groups 16 facing inside of the micelle 17.

To form the micelle 17 by the nonionic surfactant 12 in the space 84 inside the ion cluster 64, the diameter of the micelle 17 formed by the nonionic surfactant 12 may be smaller than the ion cluster diameter $d_{cl}$. In view of this, the nonionic surfactant 12 may have a molecular chain length appropriately chosen depending on the ion cluster diameter $d_{cl}$ of the solid electrolyte membrane 60 to be used. For example, when the ion cluster diameter $d_{cl}$ is about 40 Å, polyethylene-block-poly (ethylene glycol) where a sum (m+n) of the count of ethylene units (m) and the count of ethylene oxide units (n) is 34 or less, or in a range of 15 to 34 in some embodiments, may be used as the nonionic surfactant 12. From a perspective of ease in forming the micelle 17, a value of HLB ($=n/(m+n)$) may be in a range of 0.6 to 0.82. When the lauryl alcohol/ethylene oxide adduct having the count of ethylene units (m) of 6 is used as the nonionic surfactant 12, the count of ethylene oxide units (n) may be 9 to 28.

When the solid electrolyte membrane 60 is disposed between the anode (not illustrated) and the cathode (not illustrated), and a voltage is applied between the anode and the cathode, a tin ion 18 in the tin solution moves in a direction from the anode to the cathode via the ion channel 88. When the micelle 17 is not present in the space 84 inside the ion cluster 64, the tin ion 18 is trapped by the sulfo group on the inner wall surface of the ion cluster 64, thus a plurality of tin ions 18 are easily collected. Therefore, a moving speed of the tin ion 18 decreases. Meanwhile, when the tin solution according to the embodiment is used, the micelle 17 of the nonionic surfactant 12 is present in the space 84 inside the ion cluster 64 as described above. At this time, since the tin ion 18 moves between the inner wall surface of the ion cluster 64 and the micelle 17, the tin ion 18 is less likely to be collected with other tin ion 18, and the tin ion 18 can move alone in the ion channel 88 at a high speed. Thus, since the micelle 17 of the nonionic surfactant 12 functions as a mediator (chemical mediator) that accelerates the move of the tin ion 18 in the ion channel 88, a transport efficiency of the tin ion 18 is improved to increase a cathode current density.

<Method for Forming Tin Film>

Figure 2:
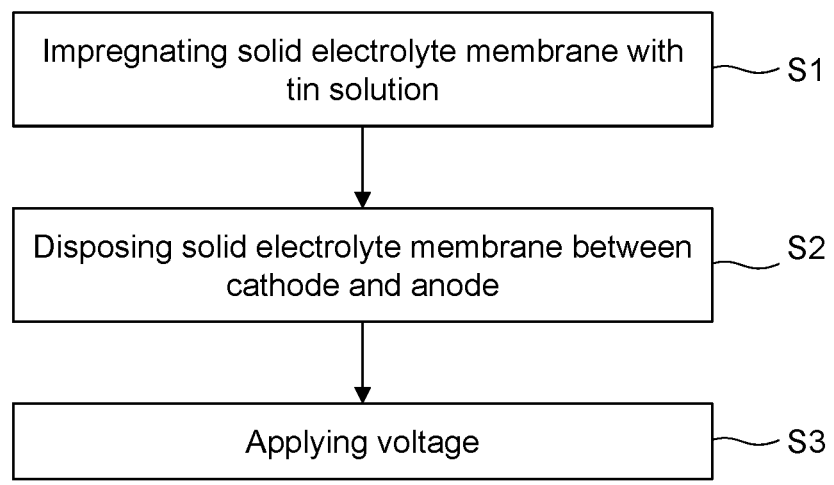
FIG. 2 is a flowchart of a method for forming a tin film.
Figure 3:
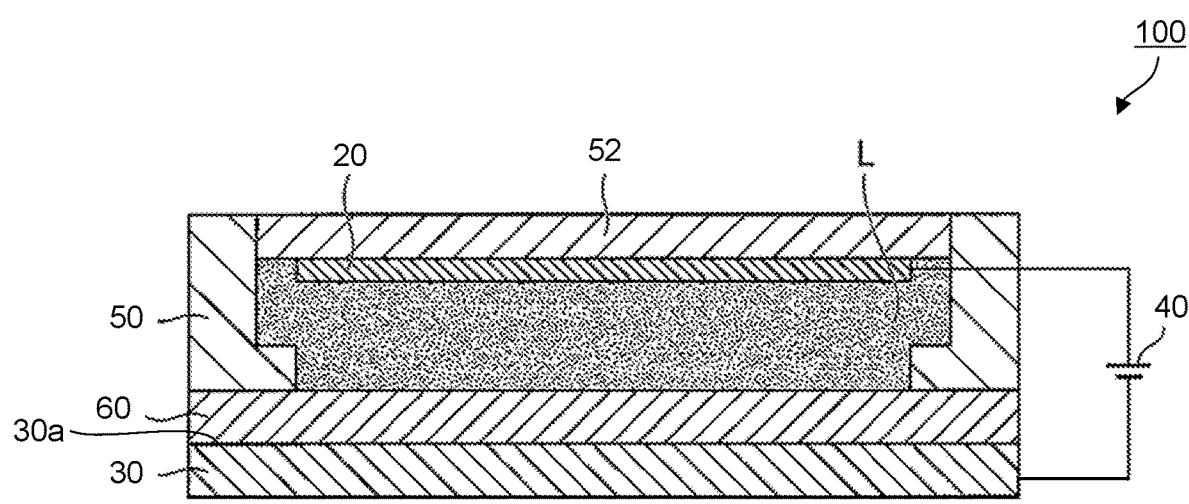
FIG. 3 is a cross-sectional view schematically illustrating an exemplary tin film formation device applicable to the method for forming the tin film.

Next, the method for forming the tin film using the above-described tin solution will be described. As illustrated in FIG. 2, the method for forming the tin film includes: impregnating a solid electrolyte membrane having a sulfo group with the above-described tin solution (Step S1); disposing the solid electrolyte membrane between an anode and a substrate as a cathode such that the substrate is in contact with the solid electrolyte membrane (Step S2); and applying a voltage between the anode and the substrate to deposit tin on a surface of the substrate (Step S3). The tin film can be formed, for example, using a film formation device 100 as illustrated in FIG. 3.

(1) Impregnating with Tin Solution (S1)

The solid electrolyte membrane having the above-described ion channel structure is impregnated with the tin solution to allow the tin solution to enter into the ion channel. The solid electrolyte membrane can be impregnated with the tin solution by, for example, immersing the solid electrolyte membrane in the tin solution or bringing the solid electrolyte membrane in contact with the tin solution.

The impregnating may be performed in a temperature range where the nonionic surfactant does not form the micelle in the tin solution, for example, lower than 35° C. This allows the nonionic surfactant to enter a space surrounded by the ion cluster of the solid electrolyte membrane. When the impregnating is performed at the temperature where the nonionic surfactant forms the micelle, the micelle cannot pass through the flow passage defined by the neck portion because the micelle is larger than the ion channel diameter, and the nonionic surfactant cannot reach the space surrounded by the ion cluster in some cases. The impregnating may be performed at the temperature equal to or higher than a freezing point of the tin solution.

(2) Disposing Solid Electrolyte Membrane (S2)

The solid electrolyte membrane is disposed between the anode and the cathode. For example, an arrangement as the film formation device 100 illustrated in FIG. 3 is allowed. The film formation device 100 includes: an anode 20 and a cathode 30; the solid electrolyte membrane 60 disposed between the anode 20 and the cathode 30 and impregnated with the tin solution; a power supply unit 40 that applies the voltage between the anode 20 and the cathode 30; and a solution containing portion 50 that disposes a tin solution L between the anode 20 and the solid electrolyte membrane 60. The solution containing portion 50 usually has a hollow columnar shape having openings in its upper portion and lower portion. The solid electrolyte membrane 60 is disposed so as to cover the opening in the lower portion of the solution containing portion 50, and a lid portion 52 is disposed so as to cover the opening in the upper portion of the solution containing portion 50. The solution containing portion 50 contains the tin solution L according to the embodiment, and houses the anode 20 so that the anode 20 is in contact with the tin solution L. While the solid electrolyte membrane 60 is movable between a position where the solid electrolyte membrane 60 is away from the cathode 30 and a position where the solid electrolyte membrane 60 is in contact with the cathode 30, the solid electrolyte membrane 60 is brought into contact with the cathode 30 in this step.

As the anode 20, a tinfoil is usable. As the cathode 30, a substrate on which the tin film is to be formed is used. Any substrate corrosion-resistant to the tin solution L and having a predetermined conductive property is usable as the cathode 30.

While the illustration is omitted, a supply tank that supplies the tin solution L to the solution containing portion 50 may be communicated with the solution containing portion 50.

(3) Applying Voltage (S3)

The power supply unit 40 applies the voltage between the anode 20 and the cathode (substrate) 30. This causes the tin ion in the tin solution L to move through the solid electrolyte membrane 60 in the direction from the anode 20 to the cathode 30. The tin ion reaches an interface (surface of the substrate 30) 30a between the solid electrolyte membrane 60 and the substrate 30 and turns into metal deposit. This forms the tin film on the substrate 30.

When the voltage is applied, the cathode 30 may be heated. Heating the cathode 30 causes the tin solution L in the space defined by the ion cluster of the solid electrolyte membrane 60 to heat, thus the micelle of the surfactant is formed inside the space. Since the micelle accelerates the move of the tin ion in the solid electrolyte membrane 60, the tin ion can move in the solid electrolyte membrane 60 at the high speed, thereby making it possible to form the tin film with a high cathode current density and a high current efficiency, which can provide the tin film without a pinhole. The heating temperature of the cathode 30 may be appropriately set to a temperature where the nonionic surfactant contained in the tin solution L forms the micelle, for example, 35° C. or more insofar as the temperature is equal to or lower than a glass transition temperature of the solid electrolyte membrane 60.

The voltage may be applied while the solid electrolyte membrane 60 is pressed onto the cathode 30 with a predetermined pressure. This can improve flatness of the tin film formed. For example, the pressure of 0.5 to 1.5 MPa may be applied.

In addition, various film forming conditions such as the applied voltage may be appropriately set depending on a film formation area, a target film thickness, and the like.

While the embodiments of the present disclosure have been described in detail above, the present disclosure is not limited thereto, and can be subjected to various kinds of changes in design without departing from the spirit and scope of the present disclosure described in the claims.

EXAMPLES

The following specifically describes the present disclosure with examples and comparative examples, but the present disclosure is not limited these examples.

Examples 1 to 37

(1) Preparing Tin Solution

In Example 1, 0.8 mol of isopropyl alcohol (IPA) and 0.02 mol of the nonionic surfactant were mixed to make a dissolved product. This dissolved product and 806 ml of tin methanesulfonate (NSP S-200 manufactured by JX Metals Trading Co., Ltd., tin content 20 wt %) were mixed, the liquid volume was adjusted to 1 L with pure water, and stirring was sufficiently performed. This obtained the tin solution (tinning bath) having the concentrations of the tin (tin ion), the methanesulfonic acid (free acid), the nonionic surfactant, and the IPA indicated in Table 1. As the nonionic surfactant, the lauryl alcohol/ethylene oxide adduct (manufactured by Merck KGaA) was used. Similarly, also in Examples 2 to 37, the amounts of the respective components were adjusted and mixed to obtain the tin solutions having the concentrations of the tin, the methanesulfonic acid, the nonionic surfactant, and the IPA indicated in Table 1. Note that the count of ethylene oxide (EO) units (EO addition mole number) of the lauryl alcohol/ethylene oxide adduct used in each example is as indicated in Table 1. In Examples 17 to 21, the methanesulfonic acid (NSP A-700 manufactured by JX Metals Trading Co., Ltd.) was appropriately mixed with the above-described dissolved product to adjust the methanesulfonic acid concentration to the values indicated in Table 1.

(2) Forming Nickel SED Substrate

A copper sputtered substrate where a copper sputtered film was formed on an AlSi substrate was prepared. A nickel film was formed on this copper sputtered substrate by the solid electrolyte deposition. Conditions of the solid electrolyte deposition were as follows. Note that a nickel film formation region was defined by disposing a polyimide tape (Kapton adhesive tape: 650R #25, manufactured by Teraoka Seisakusho Co., Ltd.) having an opening of 10×10 mm square on the copper sputtered substrate. The thickness of the nickel film formed on the copper sputtered substrate by the solid electrolyte deposition was 4 Thus obtained nickel solid electrolyte deposition (SED) substrate was used as the substrate on which the tin film was to be formed.

Anode: nickel porous body
Cathode: copper-sputtered substrate
Solid electrolyte membrane: Nafion 117 (manufactured by DuPont)
Liquid electrolyte: nickel solution (pH 4.0, nickel chloride concentration 1 M) obtained by mixing nickel chloride aqueous solution and acetic acid
Temperature of copper sputtered substrate: 60° C.
Pressure pressing solid electrolyte membrane onto copper sputtered substrate: 1 MPa
Current density: 100 mA/cm$^2$
Nickel film formation region: 10 mm×10 mm (3) Tin Film Formation An ion exchange membrane (N117, manufactured by DuPont) was prepared as the solid electrolyte membrane, and the solid electrolyte membrane was immersed in the tin solution at 25° C. to impregnate the solid electrolyte membrane with the tin solution.

The substrate (nickel SED substrate), the tinfoil (SN-443261, manufactured by Nilaco Corporation), the solid electrolyte membrane, and the tin solution were disposed such that the substrate and the tinfoil faced one another, the solid electrolyte membrane was disposed therebetween, the space between the solid electrolyte membrane and the tinfoil was filled with the tin solution, and the solid electrolyte membrane was brought in contact with the substrate.

The tin film was formed by the solid electrolyte deposition using the substrate as the cathode and the tinfoil as the anode. During the electrolyte deposition, the temperature of the substrate, the pressure for pressing the solid electrolyte membrane onto the substrate, and the current density were as indicated in Table 1, and the voltage between the cathode and the anode was 0.2 V. The electrolyte deposition time was as indicated in Table 1. The size of the tin film formation region was 10×10 mm square. The tin film formation region was defined using the polyimide tape similarly to the nickel film formation. The tin film was thus formed on the substrate. Each of the formed tin films was a film having high flatness, and the nickel film as the underlying layer was entirely covered with the tin film and not exposed to the surface.

A weight of the deposited tin was measured for each example. The current efficiency of the tin film formation was calculated by obtaining the ratio of the measurement value to a theoretical deposition amount calculated from Faraday's law.

Comparative Examples 1 to 3

(1) Preparing Tin Solution
Similarly to Example 1 excluding that the nonionic surfactant was not used, the tin solutions (tinning baths) were prepared.

(2) Forming Nickel SED Substrate
Similarly to Example 1, the nickel solid electrolyte deposition (SED) substrate was formed.

(3) Tin Film Formation
The tin solutions prepared in these comparative examples were used to form the tin films similarly to Example 1. In Comparative Examples 1 to 3, the current densities at the tin film formation were 4, 10, and 20 mA/cm$^2$, respectively, and the electrolyte deposition times were 20, 8, and 4 minutes, respectively.

TABLE 1

| | Count of EO Units [—] | Tin Concentration [g/L] | Methanesulfonic Acid Concentration [M] | Nonionic Surfactant Concentration [M] | IPA Concentration [M] | Substrate Temperature [° C.] | Pressure [MPa] | Current Density [mA/cm$^2$] | Time [min] |
|---|---|---|---|---|---|---|---|---|---|
| Example 1 | 9 | 250 | 12 | 0.02 | 0.8 | 40 | 1 | 4 | 20 |
| Example 2 | 16 | 250 | 12 | 0.02 | 0.8 | 40 | 1 | 4 | 20 |
| Example 3 | 17 | 250 | 12 | 0.02 | 0.8 | 40 | 1 | 4 | 20 |
| Example 4 | 28 | 250 | 12 | 0.02 | 0.8 | 40 | 1 | 4 | 20 |
| Example 5 | 9 | 250 | 12 | 0.02 | 0.8 | 40 | 1 | 10 | 8 |
| Example 6 | 16 | 250 | 12 | 0.02 | 0.8 | 40 | 1 | 10 | 8 |
| Example 7 | 17 | 250 | 12 | 0.02 | 0.8 | 40 | 1 | 10 | 8 |
| Example 8 | 28 | 250 | 12 | 0.02 | 0.8 | 40 | 1 | 10 | 8 |
| Example 9 | 9 | 250 | 12 | 0.02 | 0.8 | 40 | 1 | 20 | 4 |
| Example 10 | 16 | 250 | 12 | 0.02 | 0.8 | 40 | 1 | 20 | 4 |
| Example 11 | 17 | 250 | 12 | 0.02 | 0.8 | 40 | 1 | 20 | 4 |
| Example 12 | 28 | 250 | 12 | 0.02 | 0.8 | 40 | 1 | 20 | 4 |
| Example 13 | 17 | 80 | 12 | 0.02 | 0.8 | 40 | 1 | 10 | 8 |
| Example 14 | 17 | 160 | 12 | 0.02 | 0.8 | 40 | 1 | 10 | 8 |
| Example 15 | 17 | 320 | 12 | 0.02 | 0.8 | 40 | 1 | 10 | 8 |
| Example 16 | 17 | 400 | 12 | 0.02 | 0.8 | 40 | 1 | 10 | 8 |
| Example 17 | 17 | 250 | 1 | 0.02 | 0.8 | 40 | 1 | 10 | 8 |
| Example 18 | 17 | 250 | 5 | 0.02 | 0.8 | 40 | 1 | 10 | 8 |
| Example 19 | 17 | 250 | 10 | 0.02 | 0.8 | 40 | 1 | 10 | 8 |
| Example 20 | 17 | 250 | 15 | 0.02 | 0.8 | 40 | 1 | 10 | 8 |
| Example 21 | 17 | 250 | 25 | 0.02 | 0.8 | 40 | 1 | 10 | 8 |
| Example 22 | 17 | 250 | 12 | 0.003 | 0.8 | 40 | 1 | 10 | 8 |
| Example 23 | 17 | 250 | 12 | 0.01 | 0.8 | 40 | 1 | 10 | 8 |
| Example 24 | 17 | 250 | 12 | 0.03 | 0.8 | 40 | 1 | 10 | 8 |
| Example 25 | 17 | 250 | 12 | 0.04 | 0.8 | 40 | 1 | 10 | 8 |
| Example 26 | 17 | 250 | 12 | 0.1 | 0.8 | 40 | 1 | 10 | 8 |
| Example 27 | 17 | 250 | 12 | 0.02 | 0.08 | 40 | 1 | 10 | 8 |
| Example 28 | 17 | 250 | 12 | 0.02 | 0.4 | 40 | 1 | 10 | 8 |
| Example 29 | 17 | 250 | 12 | 0.02 | 1.2 | 40 | 1 | 10 | 8 |
| Example 30 | 17 | 250 | 12 | 0.02 | 1.6 | 40 | 1 | 10 | 8 |
| Example 31 | 17 | 250 | 12 | 0.02 | 2.4 | 40 | 1 | 10 | 8 |
| Example 32 | 17 | 250 | 12 | 0.02 | 0.8 | 35 | 1 | 10 | 8 |
| Example 33 | 17 | 250 | 12 | 0.02 | 0.8 | 45 | 1 | 10 | 8 |

TABLE 1-continued

| | Count of EO Units [—] | Tin Concentration [g/L] | Methanesulfonic Acid Concentration [M] | Nonionic Surfactant Concentration [M] | IPA Concentration [M] | Substrate Temperature [° C.] | Pressure [MPa] | Current Density [mA/cm²] | Time [min] |
|---|---|---|---|---|---|---|---|---|---|
| Example 34 | 17 | 250 | 12 | 0.02 | 0.8 | 50 | 1 | 10 | 8 |
| Example 35 | 17 | 250 | 12 | 0.02 | 0.8 | 60 | 1 | 10 | 8 |
| Example 36 | 17 | 250 | 12 | 0.02 | 0.8 | 40 | 0.5 | 10 | 8 |
| Example 37 | 17 | 250 | 12 | 0.02 | 0.8 | 40 | 1.5 | 10 | 8 |
| Comparative Example 1 | — | 250 | 12 | 0 | 0.8 | 40 | 1 | 4 | 20 |
| Comparative Example 2 | — | 250 | 12 | 0 | 0.8 | 40 | 1 | 10 | 8 |
| Comparative Example 3 | — | 250 | 12 | 0 | 0.8 | 40 | 1 | 20 | 4 |

<Count of EO Units>

Figure 4A:
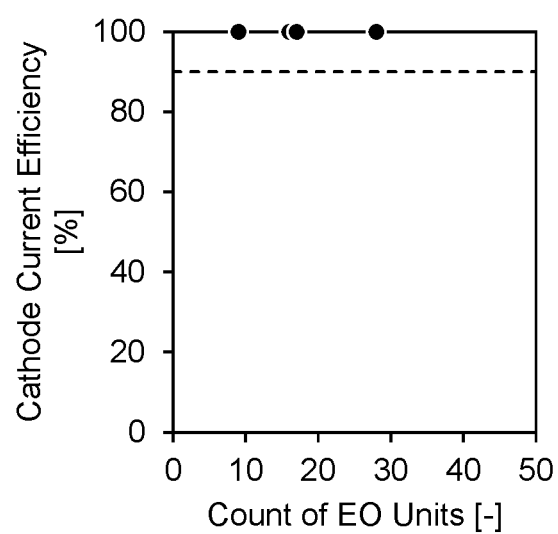
FIGS. 4A to 4C are graphs indicating a relation between a count of ethylene oxide units in a nonionic surfactant and a current efficiency.
Figure 4B:
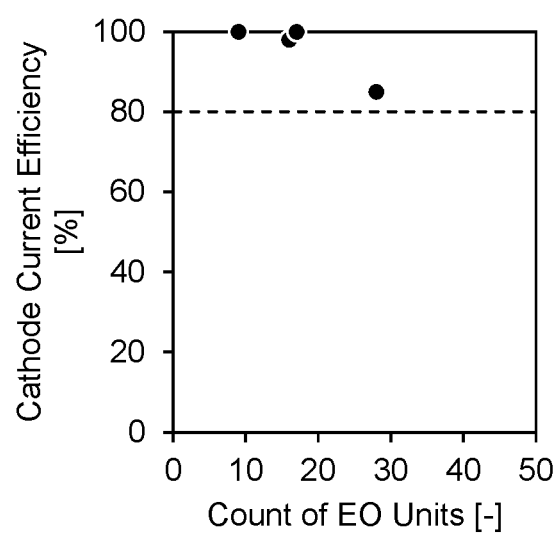
Figure 4C:
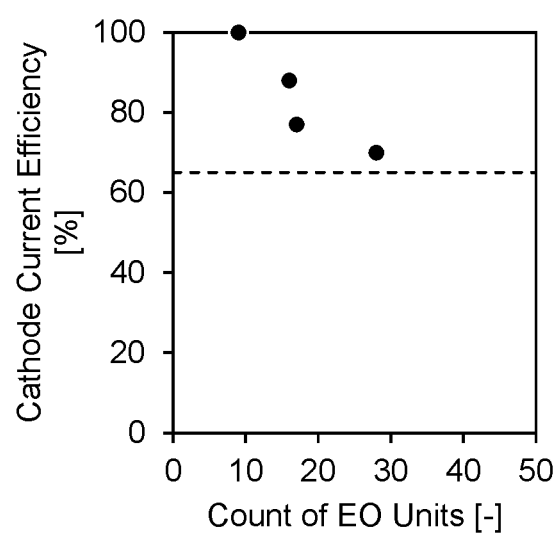

FIGS. 4A to 4C indicate relations between the count of EO units in the nonionic surfactant and the current efficiency obtained from the results of Examples 1 to 12. FIGS. 4A to 4C indicate the relations between the count of EO units and the current efficiency when the current densities were 4, 10, and 20 mA/cm², respectively, and the electrolyte deposition times were 20, 8, and 4 minutes, respectively. The current efficiencies of Comparative Examples 1 to 3 were indicated in FIGS. 4A to 4C, respectively, by dashed lines.

For each current density, the current efficiency was higher than those of the comparative examples where the nonionic surfactant was not used.

Note that since the count of EO units (n) in the nonionic surfactant used in Examples 1 to 12 was 9 to 28 and the count of ethylene units (m) in the lauryl alcohol/ethylene oxide adduct was 6, the sum (m+n) of the count of ethylene units and the count of EO units was in a range of 15 to 34, and the HLB value defined by n/(m+n) was 0.6 to 0.82.

<Tin Concentration>

Figure 5:
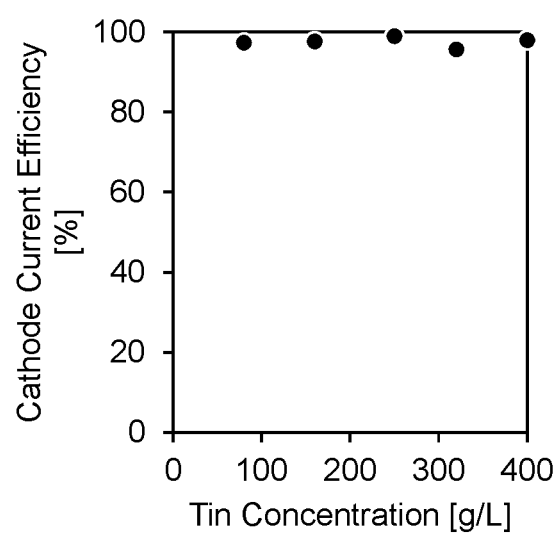
FIG. 5 is a graph indicating a relation between a tin concentration and the current efficiency.

FIG. 5 indicates a relation between the tin concentration in the tin solution and the current efficiency obtained from the results of Examples 7 and 13 to 16. For each example, the current efficiency was satisfactory.

<Methanesulfonic Acid Concentration>

Figure 6:
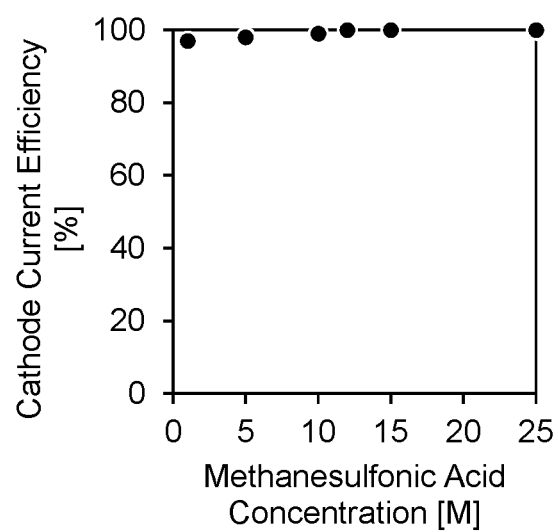
FIG. 6 is a graph indicating a relation between a methanesulfonic acid concentration and the current efficiency.

FIG. 6 indicates a relation between the methanesulfonic acid concentration in the tin solution and the current efficiency obtained from the results of Examples 7 and 17 to 21. For each example, the current efficiency was satisfactory.

<Nonionic Surfactant Concentration>

Figure 7:
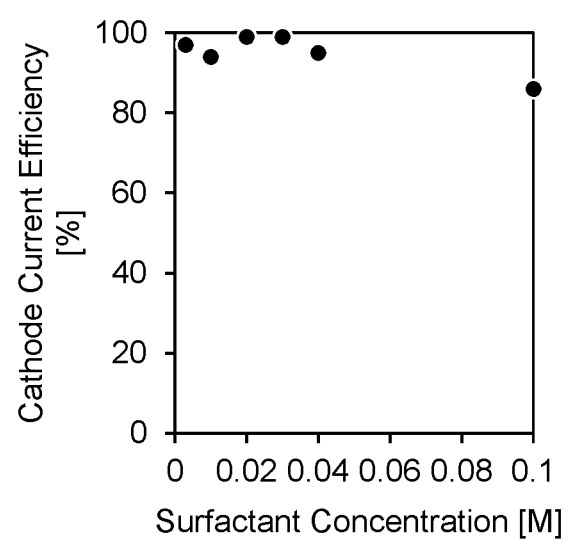
FIG. 7 is a graph indicating a relation between a nonionic surfactant concentration and the current efficiency.

FIG. 7 indicates a relation between the nonionic surfactant concentration in the tin solution and the current efficiency obtained from the results of Examples 7 and 22 to 26. For each example, the current efficiency was satisfactory.

<IPA Concentration>

Figure 8:
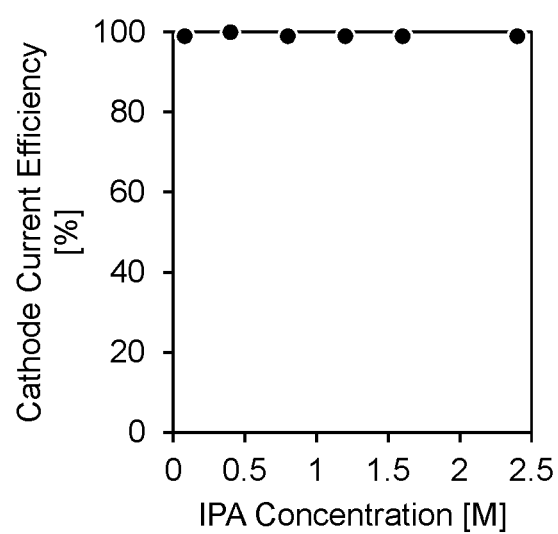
FIG. 8 is a graph indicating a relation between an IPA concentration and the current efficiency.

FIG. 8 indicates a relation between the IPA concentration in the tin solution and the current efficiency obtained from the results of Examples 7 and 27 to 31. For each example, the current efficiency was satisfactory.

<Substrate Temperature>

Figure 9:
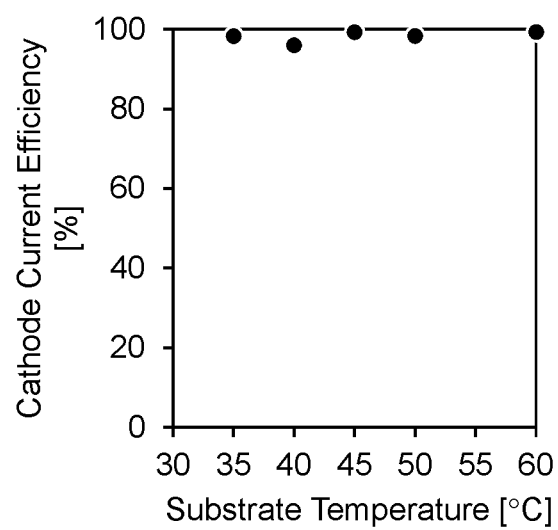
FIG. 9 is a graph indicating a relation between a substrate temperature and the current efficiency.

FIG. 9 indicates a relation between the substrate temperature (cathode temperature) and the current efficiency obtained from the results of Examples 7 and 32 to 35. For each example, the current efficiency was satisfactory.

<Pressure>

Figure 10:
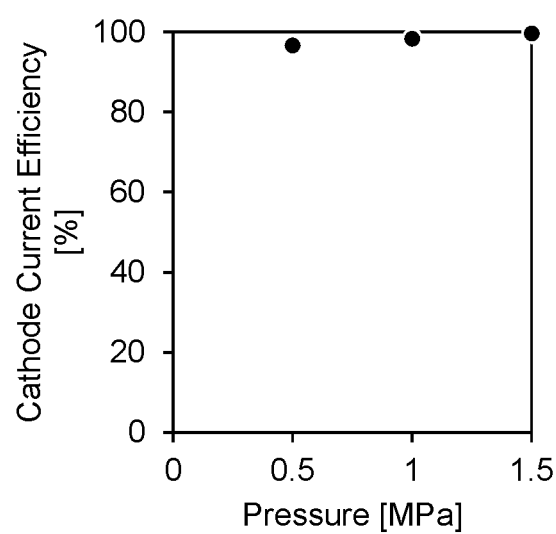
FIG. 10 is a graph indicating a relation between a pressure for pressing the solid electrolyte membrane onto the substrate and the current efficiency.

FIG. 10 indicates a relation between the pressure for pressing the solid electrolyte membrane onto the substrate and the current efficiency obtained from the results of Examples 7, 36, and 37. For each example, the current efficiency was satisfactory.

DESCRIPTION OF SYMBOLS

1 Ion channel structure
12 Nonionic surfactant
14 Hydrophilic group
16 Hydrophobic group
17 Micelle
18 Tin ion
20 Anode
30 Cathode
40 Power supply unit
50 Solution containing portion
60 Solid electrolyte membrane
62 Sulfo group
64 Ion cluster
66 Neck portion
84 Space
86 Flow passage
88 Ion channel
100 Film formation device
L Tin solution

What is claimed is:

1. A tin solution for tin film formation containing;
   tin methanesulfonate;
   methanesulfonic acid;
   water;
   isopropyl alcohol; and
   polyethylene-block-poly (ethylene glycol), wherein the polyethylene-block-poly (ethylene glycol) is a lauryl alcohol/ethylene oxide adduct having a count of ethylene oxide units (n) of 9 to 28.

2. The tin solution according to claim 1,
   wherein a concentration of the methanesulfonic acid in the tin solution is 1 to 25 M.

3. A method for forming a tin film, comprising:
   impregnating a solid electrolyte membrane having a sulfo group with the tin solution according to claim 1;
   disposing the solid electrolyte membrane between a substrate as a cathode and an anode such that the substrate is in contact with the solid electrolyte membrane; and
   applying a voltage between the anode and the substrate to deposit tin on a surface of the substrate.

4. The tin film forming method according to claim 3,
   wherein in the impregnating, a temperature of the tin solution is equal to or higher than a freezing point of the tin solution, and lower than 35° C., and
   wherein in the applying the voltage, a temperature of the substrate is equal to or higher than 35° C., and equal to or lower than a glass transition temperature of the solid electrolyte membrane.

* * * * *